US010734619B2

(12) United States Patent
Nakano et al.

(10) Patent No.: US 10,734,619 B2
(45) Date of Patent: Aug. 4, 2020

(54) BATTERY DEVICE, BATTERY UNIT, AND METHOD OF INSTALLING BATTERY DEVICE

(71) Applicant: NGK INSULATORS, LTD., Nagoya-shi (JP)

(72) Inventors: Hiroyuki Nakano, Nagoya (JP); Kenta Asano, Kasugai (JP)

(73) Assignee: NGK Insulators, Ltd., Nagoya (JP)

(*) Notice: Subject to any disclaimer, the term of this patent is extended or adjusted under 35 U.S.C. 154(b) by 51 days.

(21) Appl. No.: 16/106,280

(22) Filed: Aug. 21, 2018

(65) Prior Publication Data

US 2018/0358590 A1    Dec. 13, 2018

Related U.S. Application Data

(63) Continuation of application No. PCT/JP2017/006933, filed on Feb. 23, 2017.

(30) Foreign Application Priority Data

Feb. 24, 2016 (JP) .................... 2016-033544

(51) Int. Cl.
*H01M 2/10* (2006.01)
(52) U.S. Cl.
CPC ........... *H01M 2/1077* (2013.01); *H01M 2/10* (2013.01)
(58) Field of Classification Search
CPC .............................. H01M 2/10; H01M 2/1077
See application file for complete search history.

(56) References Cited

U.S. PATENT DOCUMENTS

| 2010/0062321 | A1* | 3/2010 | Nakamura | ............... B60K 1/04 429/62 |
| 2012/0003522 | A1* | 1/2012 | Fuhr | .................. H01M 2/1077 429/120 |
| 2013/0143092 | A1 | 6/2013 | Nagatani et al. | |

(Continued)

FOREIGN PATENT DOCUMENTS

| CN | 101529647 A | 9/2009 |
| CN | 102934277 * | 2/2013 |

(Continued)

OTHER PUBLICATIONS

Decision of JPO to grant patent for Application No. 2017-538267 (Year: 2018).*

(Continued)

*Primary Examiner* — Alexander Usyatinsky
(74) *Attorney, Agent, or Firm* — Burr & Brown, PLLC

(57) ABSTRACT

A battery device may include a battery frame, and a battery module disposed on the battery frame. The battery frame may include a base member, a slide base being disposed on an upper surface of the base member and being formed in a rectangular shape defined by a pair of first sides extending in a first direction and a pair of second sides extending in a second direction in a plan view, a plurality of metal springs being mounted on an upper surface of the slide base at intervals along the first direction of the slide base, and being extensible in a vertical direction, and a support plate being connected to upper sides of the plurality of springs and supporting the battery module on an upper surface of the support plate.

6 Claims, 7 Drawing Sheets

(56) References Cited

U.S. PATENT DOCUMENTS

2013/0273403 A1* 10/2013 Saruhashi ........... H01M 2/1077
    429/99
2014/0096374 A1* 4/2014 Syuto ................ H01M 2/00
    29/623.1

FOREIGN PATENT DOCUMENTS

| | | | |
|---|---|---|---|
| CN | 102934277 | A | 2/2013 |
| CN | 103895900 | * | 4/2014 |
| CN | 103895900 | A | 7/2014 |
| DE | 10 2010 038 681 | A1 | 2/2012 |
| JP | H07-315782 | A1 | 12/1995 |
| JP | 2008-135191 | A1 | 6/2008 |
| JP | 2013-206795 | A1 | 10/2013 |
| JP | 2013-246990 | A1 | 12/2013 |
| JP | 2014-093146 | A1 | 5/2014 |
| JP | 2015-185413 | A1 | 10/2015 |
| WO | 2012/026224 | A1 | 3/2012 |
| WO | 2012/102383 | A1 | 8/2012 |

OTHER PUBLICATIONS

Decision of EPO to grant patent for Application No. 17756612.2-11 08 / 3252848 (Year: 2019).*
Chinese Office Action (Application No. 201780001070.0) dated Sep. 12, 2019 (with English translation).
International Search Report and Written Opinion (Application No. PCT/JP2017/006933) dated May 16, 2017.
Extended European Search Report (Application No. 17756612.2) dated Jun. 4, 2018.

* cited by examiner

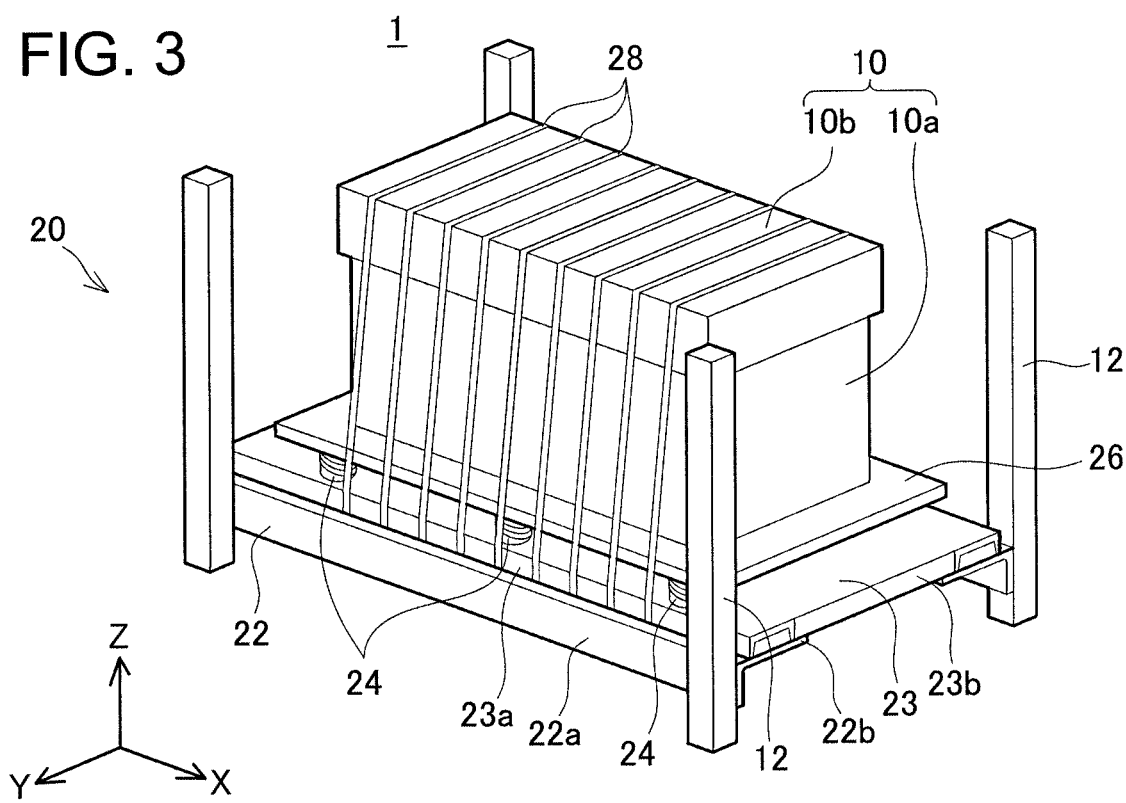
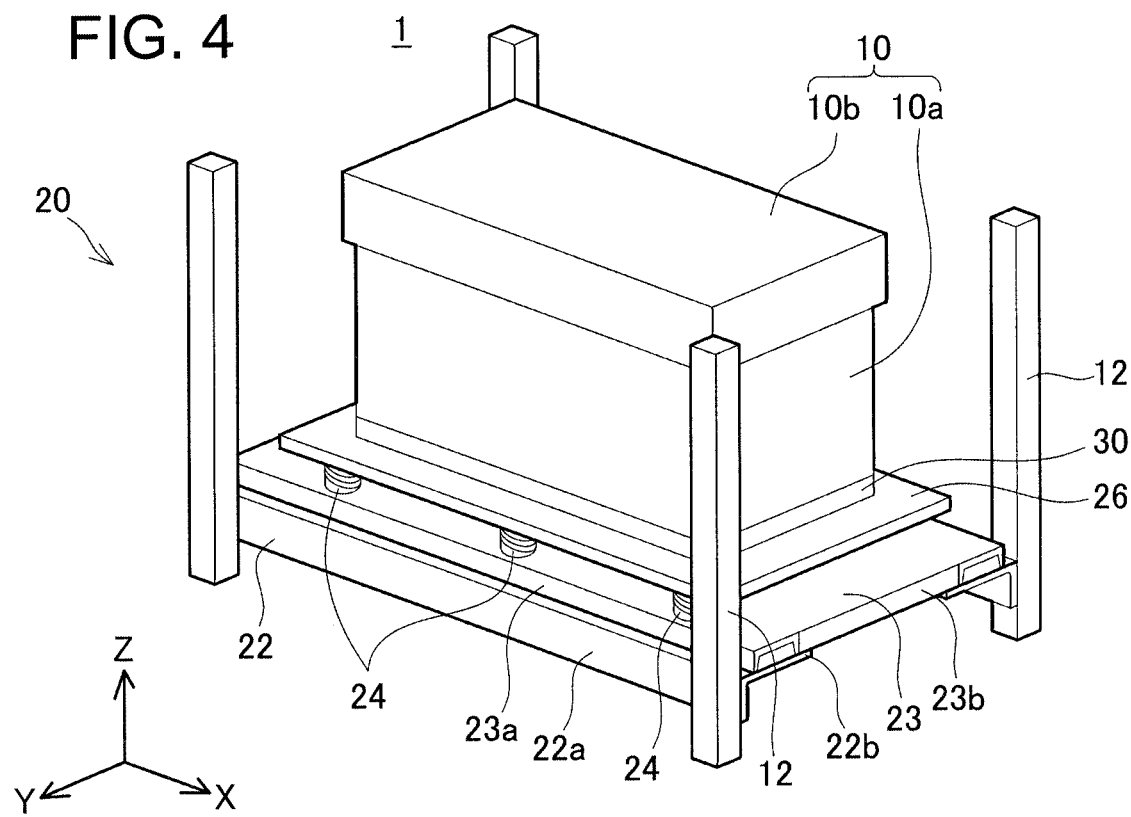

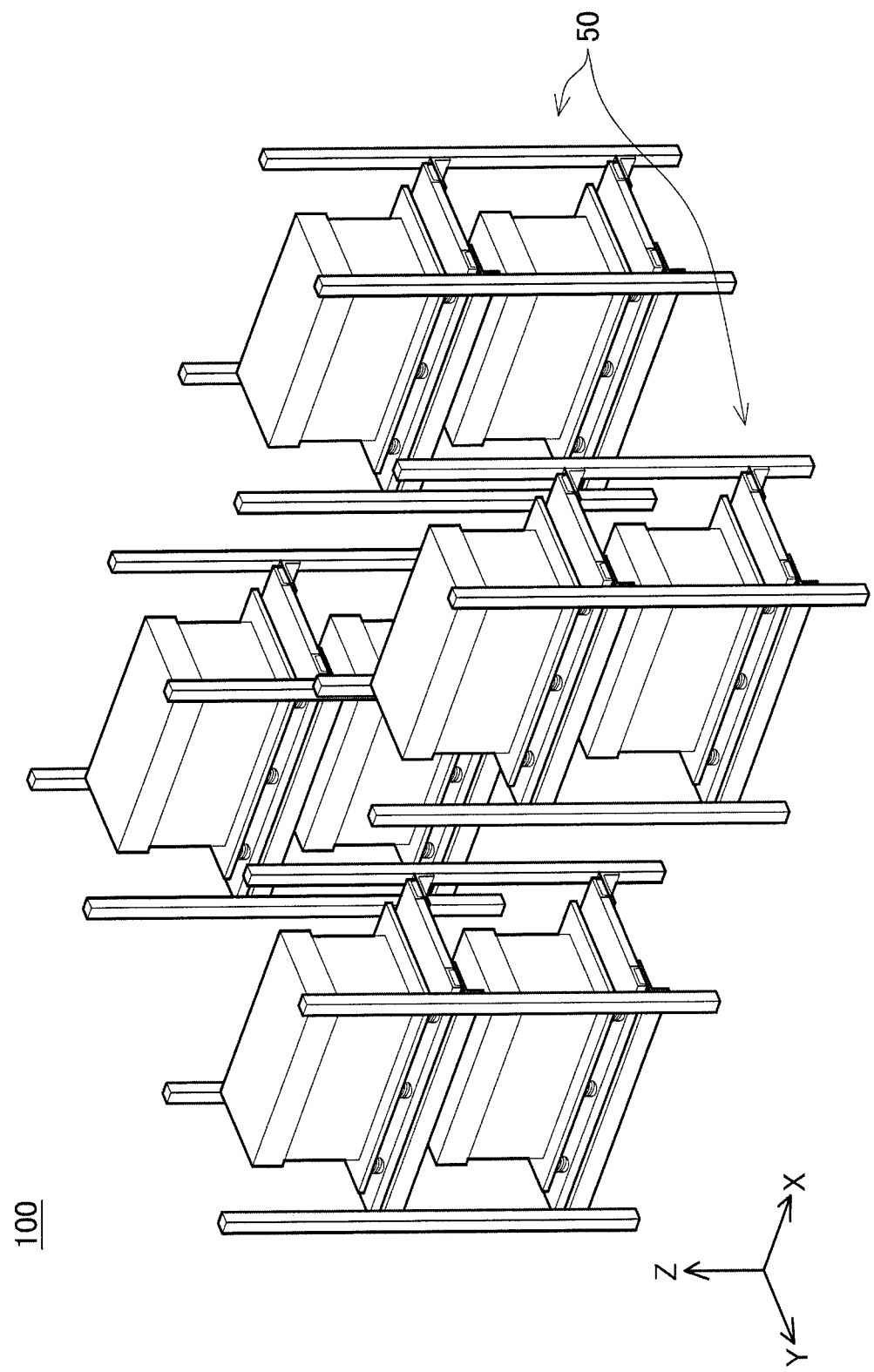

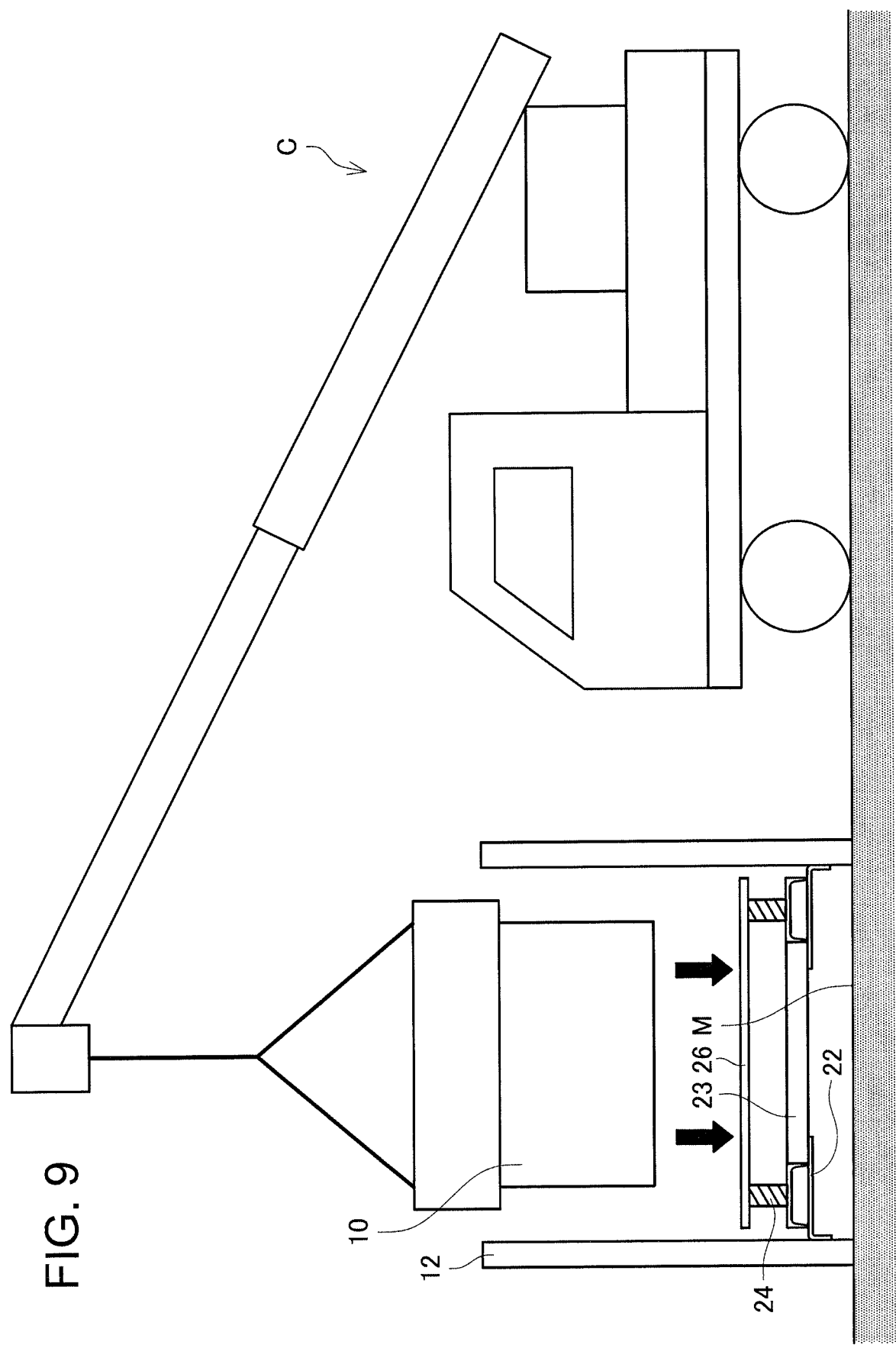

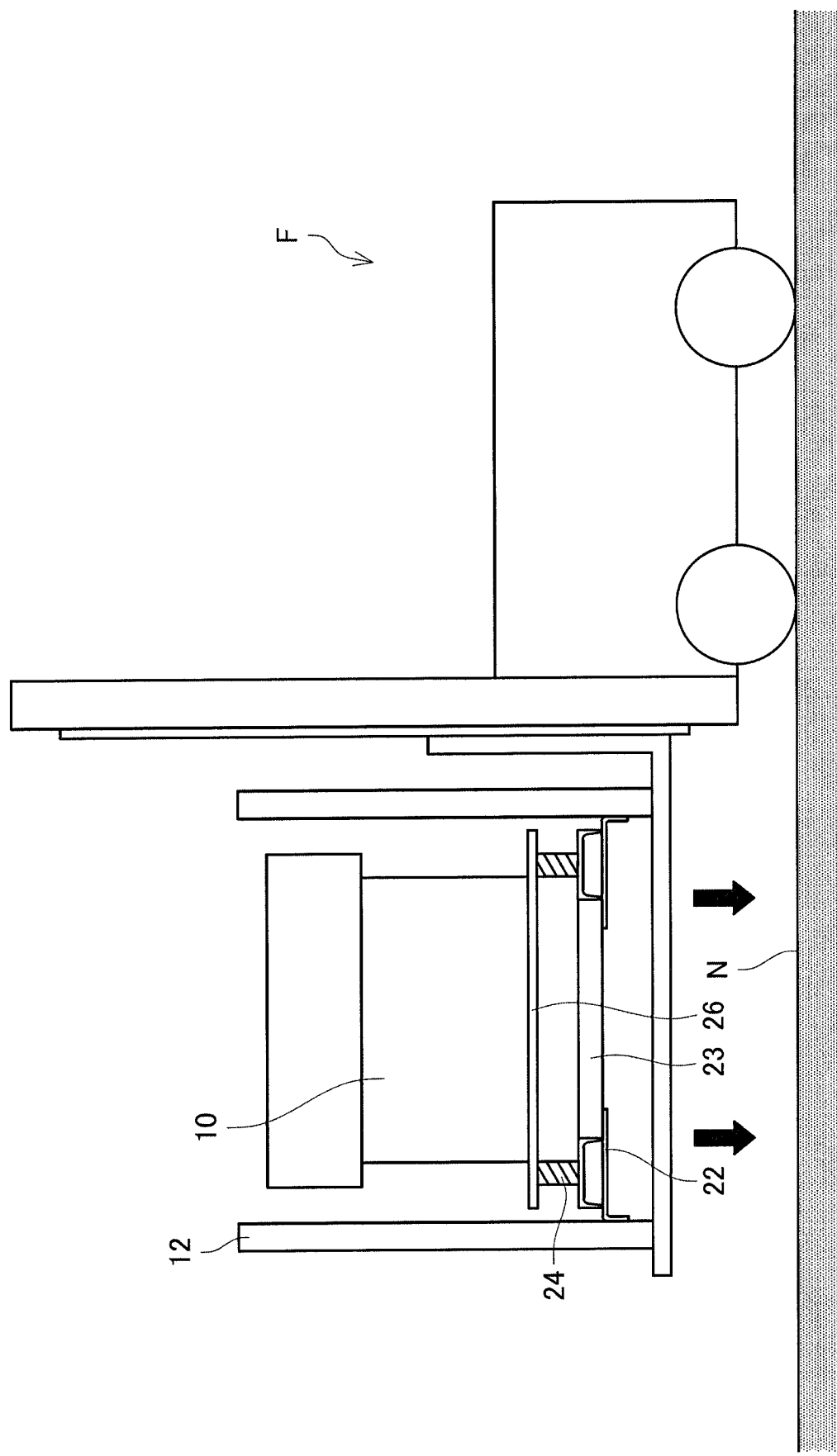

BATTERY DEVICE, BATTERY UNIT, AND METHOD OF INSTALLING BATTERY DEVICE

TECHNICAL FIELD

The technique disclosed herein relates to a battery device, a battery unit, and a method of installing a battery device.

BACKGROUND

Battery packs such as NaS batteries, Li-ion batteries, and Ni—$H_2$ batteries configure a battery module by arranging a closely-bundled plurality of individual batteries inside a casing. International Publication No. WO 2012/026224 A1 discloses a rack for battery packs for housing such a battery module. A transportation rack for battery packs disclosed in International Publication No. WO 2012/026224 A1 can be used also as an installation rack, and as such, installation of battery modules can be performed easily.

SUMMARY

In the technique of International Publication No. WO 2012/026224 A1, a cushioning material is arranged between a battery module and a battery rack to prevent damages and failures upon transportation of the battery module. This cushioning material is normally formed of a combustible material such as foamed resin, which has superior cushioning performance. Due to this, for the safety thereof, the cushioning material needs to be removed from between the battery module and the battery rack after the battery module has been installed. There is a problem that man-hours of battery module installation work are increased for the work of removing the cushioning material. The description herein discloses a technique that suitably prevents damages and failures of a battery module to be housed, and reduces man-hours of battery module installation work.

A battery device disclosed herein may comprise a battery frame, and a battery module disposed on the battery frame. The battery frame may comprise a base member, a slide base being disposed on an upper surface of the base member and being formed in a rectangular shape defined by a pair of first sides extending in a first direction and a pair of second sides extending in a second direction in a plan view, a plurality of metal springs being mounted on an upper surface of the slide base at intervals along the first direction of the slide base, and being extensible in a vertical direction, and a support plate being connected to upper sides of the plurality of springs and having an upper surface on which the battery module is supported.

In the above battery device, the battery frame comprises the slide base and the plurality of metal springs mounted on the upper surface of the slide base. Further, the support plate on which the battery module is disposed is connected to the upper sides of the plurality of springs. Due to this, since the plurality of springs is arranged between the slide base and the battery module, vibration upon transporting the battery module is absorbed by the springs, and damages and failures of the battery module can be prevented. Further, since the metal springs are used, the springs as buffer members do not need to be removed even after the battery device (that is, the battery frame in which the battery module is disposed on the support plate) is installed at an installation location. Due to this, man-hours of battery device installation work can be reduced.

BRIEF DESCRIPTION OF THE DRAWINGS

FIG. 3 is a perspective view schematically showing a configuration of a battery device of a second embodiment;

FIG. 4 is a perspective view schematically showing a configuration of a battery device of a third embodiment;

FIG. 8 is a perspective view schematically showing a configuration of a battery unit of a sixth embodiment;

FIG. 9 is a diagram showing an installation method of a battery device; and

FIG. 10 is a diagram showing the installation method of the battery device.

DETAILED DESCRIPTION

Figure 1:
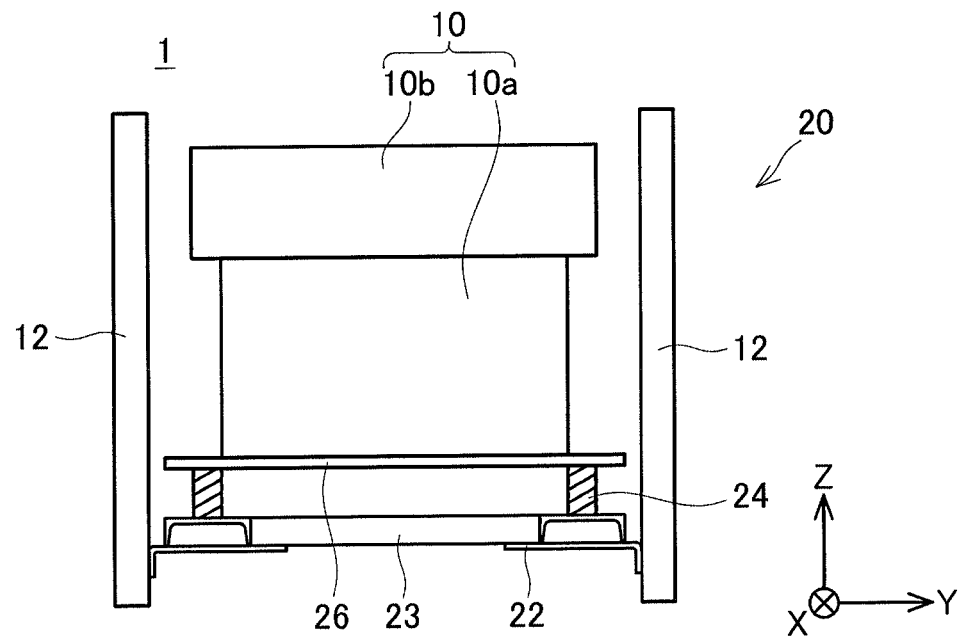
FIG. 1 is a front view schematically showing a configuration of a battery device of a first embodiment.

Some of the primary features of embodiments described hereinbelow will be listed. It should be noted that the technical elements described herein are technical elements independent from one another, exhibit technical usefulness individually or in various combinations, and are not limited to combinations described in the claims as originally filed.

(Feature 1) A battery device disclosed herein may further include a plurality of metal bands fixing the battery module to the support plate. Further, each of the plurality of metal bands may have one end connected to one of the pair of first sides and the other end connected to the other of the pair of first sides. Further, the battery module may be held between the plurality of metal bands and the support plate. According to such a configuration, the battery module can be firmly fixed to the support plate. For example, by using the metal bands upon transporting the battery device, the failures of the battery module upon the transportation can suitably be suppressed. It should be noted that, since large vibration or the like does not act on the battery module after the battery device has been installed at the installation location, the metal bands may be removed from the battery device.

(Feature 2) The battery device disclosed herein may further include a buffer member being disposed between a lower surface of the battery module and the upper surface of the support plate. Further, the buffer member may be constituted of an incombustible material. According to such a configuration, the buffer member does not need to be removed after the installation of the battery frame, and the battery module is supported on the base member via the springs and the buffer member, and as such, the damages and failures of the battery module can further be prevented.

(Feature 3) In the battery device disclosed herein, the battery frame may further include a positioning member being disposed to encircle an outer periphery of the upper surface of the support plate and positioning the battery module with respect to the support plate in a horizontal direction. Further, the positioning member may include a first portion being in contact with the support plate and a second portion being bent from the first portion and extending upward, and the second portion may be in contact with a side surface of the battery module which is placed. According to such a configuration, a position of the battery module in the horizontal direction relative to the support plate can accurately be decided, and positional displacement of the battery module caused upon transportation can suitably be prevented.

(Feature 4) In the battery device disclosed herein, the battery frame may further include a stopper being disposed at a position between the upper surface of the slide base and a lower surface of the support plate and different from positions where the plurality of springs is disposed. Further, the stopper may not be in contact with the support plate when the plurality of springs is in an initial state, and may be in contact with the support plate when the plurality of springs is compressed by a predetermined length from the initial state. According to such a configuration, even if settling is generated in the plurality of springs by the constant application of load by the battery module, the stopper makes contact with the support plate to support the battery module. Due to this, the settling of the springs can be suppressed from further progressing.

(Feature 5) A battery unit disclosed herein may include a plurality of the battery frames according to any one of the features described above. Further, the plurality of the battery frames may be arranged at intervals in the vertical direction and arranged at intervals along at least one of the first direction and the second direction, and each of the plurality of battery module may be placed on corresponding one of the plurality of battery frames.

(Feature 6) A method of installing the battery device may include placing the battery module on the battery frame at a first location, conveying the battery frame on which the battery module is placed from the first location to a second location in a state where the stopper is not disposed between the slide base and the support plate, installing the battery frame on which the battery module is placed at the second location, and disposing the stopper between the slide base and the support plate after installing the battery frame at the second location.

First Embodiment

Figure 2:
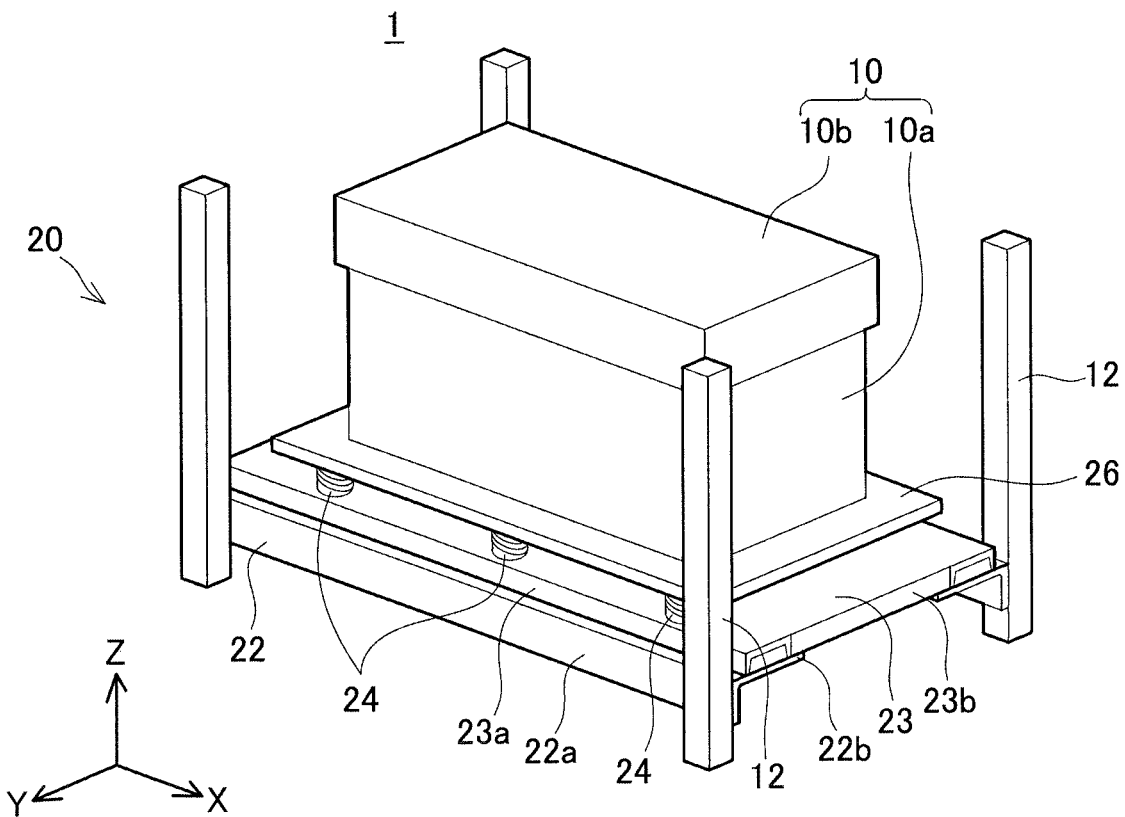
FIG. 2 is a perspective view schematically showing the configuration of the battery device of the first embodiment.

Hereinbelow, a battery device 1 of a first embodiment will be described with reference to FIGS. 1 and 2. As shown in FIGS. 1 and 2, the battery device 1 includes a battery module 10 and a battery frame 20. The battery module 10 has a rectangular shape in a plan view, having sides extending in a first direction (X direction in the drawings (which may hereinafter be simply referred to as X direction)), and sides extending in a second direction (Y direction in the drawings (which may hereinafter be simply referred to as Y direction)). The battery module 10 includes a battery pack, a casing 10a, and a lid 10b. Although not shown, the battery pack is a battery in which NaS batteries, Li-ion batteries, Ni—H$_2$ batteries and the like are bundled by several hundreds. The casing 10a includes an opening at its upper portion, and houses the battery pack therein. The lid 10b is arranged to cover the opening of the casing 10a.

The battery module 10 is disposed on the battery frame 20. The battery frame 20 includes a pair of base members 22, four columns 12, a slide base 23, a plurality of springs 24, and a support plate 26.

As shown in FIG. 2, each of the pair of base members 22 has a rectangular shape having long sides 22a extending in the X direction and short sides 22b extending in the Y direction. Each of the base members 22 has its longitudinal direction extending in the X direction, and connects two columns 12 arranged along the X direction at an interval therebetween. The pair of base members 22 is arranged along the Y direction from each other at an interval therebetween.

The four columns 12 connected to the pair of base members 22 are arranged at respectively at four corners of a rectangle as seen in the plan view. The columns 12 extend in a Z direction, which is perpendicular to both the X and Y directions. Positions of upper ends of the columns 12 are located above an upper surface of the battery module 10 (upper surface of the lid 10b) when the battery module 10 is disposed on the battery frame 20.

The slide base 23 has a rectangular shape having first sides 23a extending in the X direction and second sides 23b extending in the Y direction. The slide base 23 is arranged on upper surfaces of the base members 22. The slide base 23 is configured slidable in the X direction relative to the base members 22. The slide base 23 is configured slidable in the X direction, which allows the battery module 10 disposed on the slide base 23 (to be more precise, on the support plate 26) can be moved by sliding integrally with the slide base 23.

As shown in FIG. 2, the plurality of springs 24 is arranged on an upper surface of the slide base 23 along the X direction of the slide base 23 at intervals. Specifically, in the present embodiment, three of them are arranged at equal intervals in the X direction on the upper surface on the slide base 23 respectively in proximity to the pair of first sides 23a. Thus, six springs 24 are arranged on the upper surface of the slide base 23. The springs 24 are coil springs, and are extensible in the vertical direction (Z direction). The plurality of springs 24 is constituted of metal material (such as spring steel wire). Upper ends of the plurality of springs 24 are fixed to the support plate 26 to be described later. As such, positions of the springs 24 relative to the support plate 26 are fixed.

The support plate 26 has a rectangular shape in the plan view. As aforementioned, the upper ends of the plurality of springs 24 are fixed to a lower surface of the support plate 26. The battery module 10 is disposed on an upper surface of the support plate 26. Since lower ends of the plurality of springs 24 are not fixed to the slide base 23, a position of the support plate 26 relative to the slide base 23 thereby changes, however, the positions of the plurality of springs 24 relative to the support plate 26 do not change. Due to this, when the battery module 10 is placed at a predetermined position on the upper surface of the support plate 26, the battery module 10 is suitably supported by the plurality of springs 24. That is, load is uniformly applied to the plurality of springs 24, and the upper surface of the support plate 26 can maintain its parallelism.

It should be noted that numbers and specifications (such as spring coefficients, set load, set lengths, etc.) of the springs 24 to be arranged between the support plate 26 and the slide base 23 can be designed based on a maximum velocity (for example, 3 g) that acts on the battery module 10 upon transporting the battery device 1. That is, the numbers and specifications of the springs are determined so that the plurality of springs 24 does not make tight contact with each other when the maximum velocity acts in the vertical direction of the battery module 10. By setting as above, the plurality of springs 24 functions as springs even when the maximum velocity acts on the battery module 10, so damages to the battery module 10 can be prevented.

In the battery device 1 of the first embodiment, the plurality of springs 24 constituted of metal functions as cushioning materials for the battery module 10 disposed on the battery frame 20. Due to this, unlike the conventional cushioning material constituted of combustible material, the cushioning materials (springs) do not need to be removed after having installed the battery device 1. As such, damages to the battery module 10 upon transportation is prevented while reducing man-hours of installation work of the battery device 1.

Second Embodiment

Next, a battery device of a second embodiment will be described with reference to FIG. 3. Hereinbelow, only features that differ from the first embodiment will be described, and detailed description for configurations that are identical to the first embodiment will be omitted. The same applies to other embodiments as well.

As shown in FIG. 3, the battery frame of the second embodiment includes a plurality of metal bands 28. The plurality of metal bands 28 fixes the battery module 10 to the support plate 26. The plurality of metal bands 28 is constituted of iron, or iron-based alloy. Each of the plurality of metal bands 28 has its one end connected to one of the first sides 23a of the slide base 23, and the other end connected to the other of the first sides 23a of the slide base 23. Connections of the plurality of metal bands 28 to the slide base 23 are not particularly limited, however, buckle-fastening type metal bands may for example be used. The battery module 10 is held between the plurality of metal bands 28 and the support plate 26 and is fixed to the support plate 26 by providing each of the plurality of metal bands 28 with tension force. Due to this, even if velocity acts on the battery module 10 upon the transportation of the battery device 1, the battery module 10 is prevented from floating off of the support plate 26. It should be noted that in the present embodiment, the battery module 10 is fixed by nine strands of metal bands 28, and these metal bands 28 are arranged at equal intervals relative to the first sides 23a (that is, along a first direction).

In the battery device of the second embodiment, the position of the battery module 10 relative to the support plate 26 can firmly be fixed by the metal bands 28. Due to this, positional displacement of the battery module 10 relative to the support plate 26 can be suppressed against vibration and impact upon the transportation of the battery device.

Third Embodiment

Next, a battery device of a third embodiment will be described. As shown in FIG. 4, the battery frame of the third embodiment includes a buffer member 30. The buffer member 30 is arranged between the lower surface of the battery module 10 and the upper surface of the support plate 26. The buffer member 30 is configured in substantially a same shape as the battery module 10 in the plan view. The buffer member 30 is constituted of incombustible material. As the buffer member 30, a metal buffer member (such as steel wool) may be used. A thickness of the buffer member 30 (length in the Z direction) is not particularly limited, and it is a thickness by which force (vibration, etc.) acting on the battery module 10 upon the transportation of the battery module 10 can suitably be buffered.

With the battery device of the third embodiment, damages and failures of the battery device can further be prevented by the buffer member 30. Further, the buffer member 30 is constituted of the incombustible material. Due to this, the buffer member 30 does not need to be removed after having installed the battery frame, and the man-hours of installation work of the battery frame can be reduced. It should be noted that this configuration of the present embodiment may be used in the battery devices of other embodiments.

Fourth Embodiment

Figure 5:
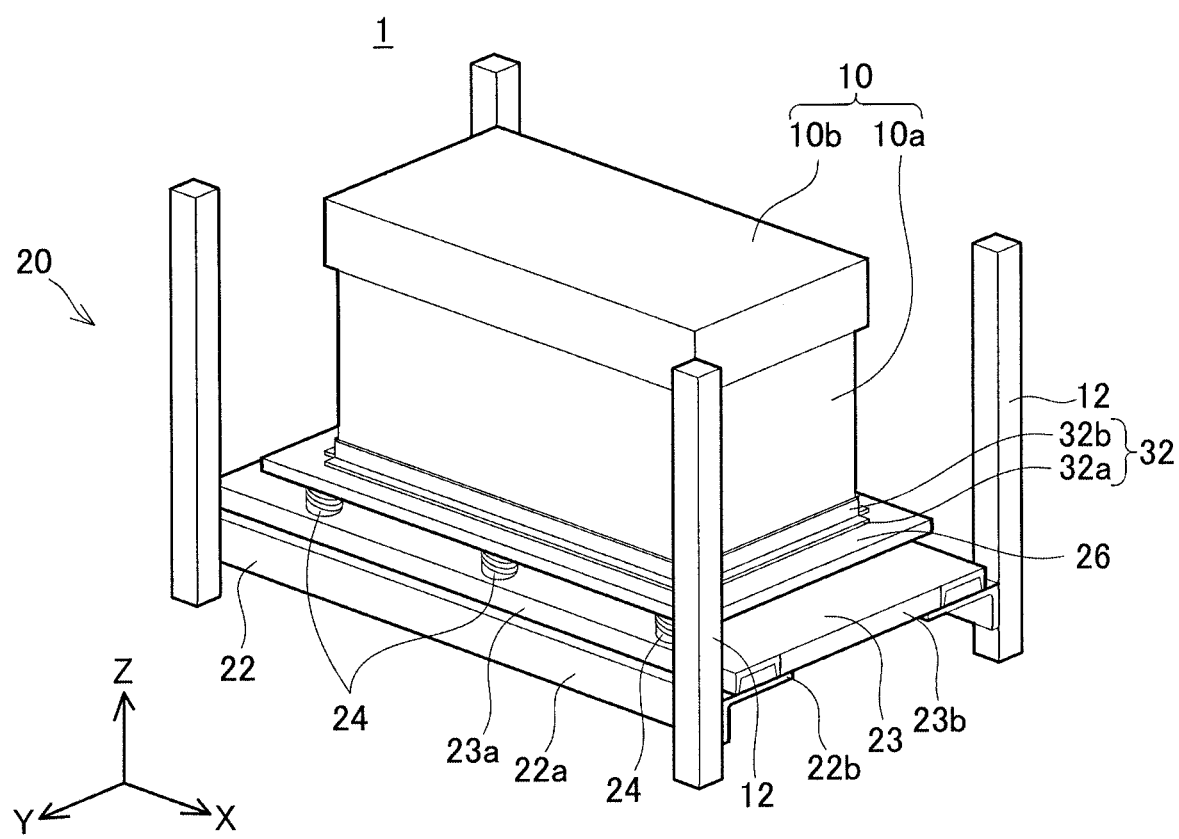
FIG. 5 is a perspective view schematically showing a configuration of a battery device of a fourth embodiment.

Next, a battery device of a fourth embodiment will be described. As shown in FIG. 5, the battery frame of the fourth embodiment includes a positioning member 32. The positioning member 32 fixes the position of the battery module 10 relative to the support plate 26 in a horizontal direction (in XY plane). The positioning member 32 is arranged to encircle an outer periphery of the upper surface of the support plate 26. The positioning member 32 includes a first portion 32a and a second portion 32b. The first portion 32a is in contact with the support plate 26, and is fixed to the support plate 26. The second portion 32b extends in the Z direction by being bent from an inner peripheral edge of the first portion 32a. The second portion 32b is in contact with side surfaces of the battery module 10.

With the battery device of the fourth embodiment, the position of the battery module 10 relative to the support plate 26 (position in the horizontal direction) can accurately be positioned by the positioning member 32. Due to this, the positional displacement of the battery module 10 can suitably be prevented. Due to this, the load is suitably applied to the plurality of springs 24, and the battery module 10 can suitably be supported. It should be noted that this configuration of the present embodiment may be used in the battery devices of other embodiments.

Fifth Embodiment

Figure 6:
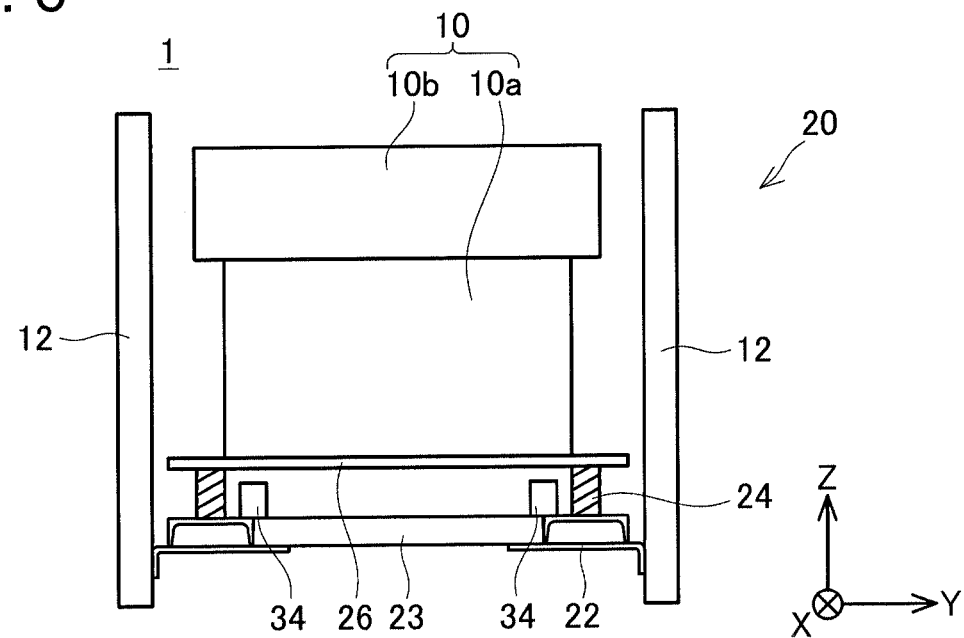
FIG. 6 is a front view schematically showing a configuration of a battery device of a fifth embodiment.
Figure 7:
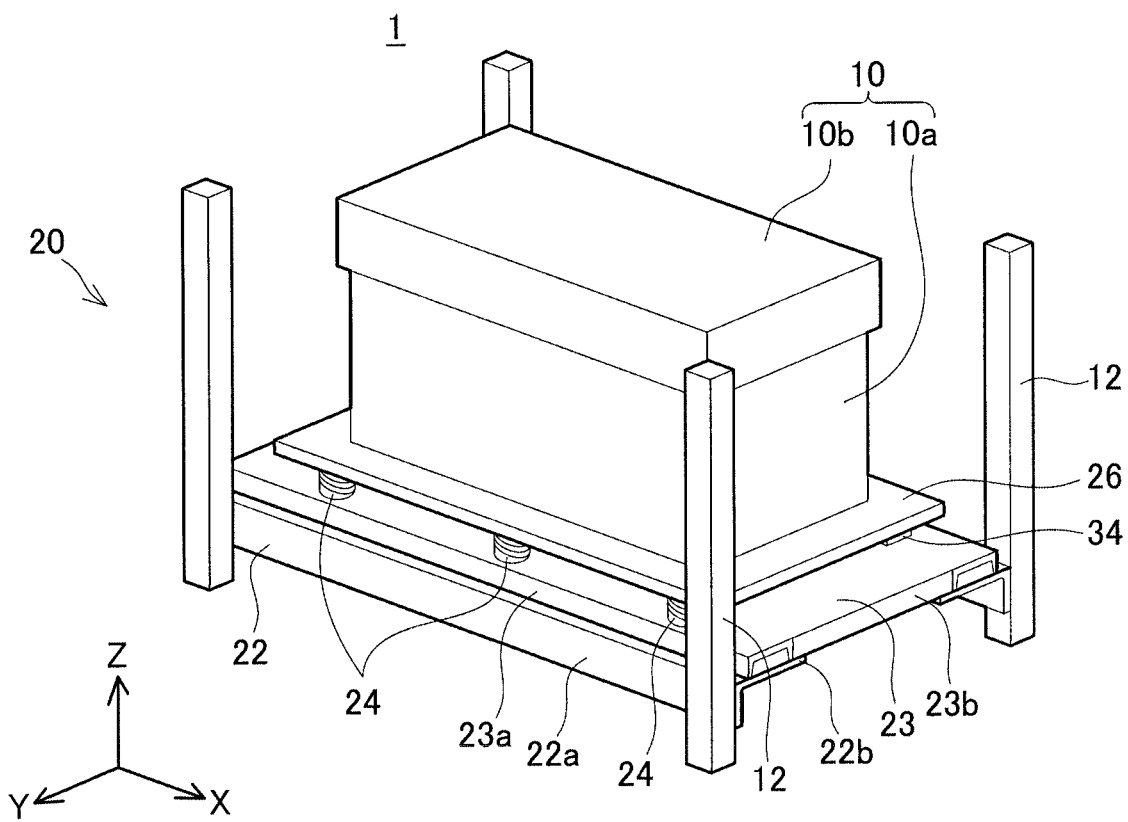
FIG. 7 is a perspective view schematically showing the configuration of the battery device of the fifth embodiment.

Next, a battery device of a fifth embodiment will be described. As shown in FIGS. 6 and 7, the battery frame of the fifth embodiment includes stoppers 34. The stoppers 34 are arranged on the upper surface of the slide base 23 respectively in proximity to the pair of first sides 23a, and further, they are arranged between the upper surface of the slide base 23 and the lower surface of the support plate 26. The stoppers 34 are square bars extending in the X direction, and each of them is arranged at a position on an inner side than a position where corresponding one of the plurality of springs 24 is arranged. Upper surfaces of the stoppers 34 do not make contact with the lower surface of the support plate 26 when the plurality of springs 24 is in an initial state (static state in which no settling is generated in the springs 24). That is, when the plurality of springs 24 is in the initial state, a space is existing between upper surfaces of the stoppers 34 and the lower surface of the support plate 26 even after the battery module 10 is disposed on the upper surface of the support plate 26. On the other hand, when the plurality of springs 24 is compressed by a predetermined length from the initial state, the upper surfaces of the stoppers 34 and the lower surface of the support plate 26 make contact. As such, if the springs 24 are in the initial state, the springs 24 would not be compressed by the predetermined length when the battery module 10 is disposed on the upper surface of the support plate 26, and the support plate 26 would not make contact with the stoppers 34.

With the battery device of the fifth embodiment, the upper surfaces of the stoppers 34 and the lower surface of the support plate 26 make contact when the plurality of springs 24 become exhausted by constant application of the load of the battery module 10 (that is, when the compression length of the plurality of springs becomes greater than the predetermined length). Due to this, the load of the battery module 10 can be received by the stoppers 34, and the settling of the plurality of springs 24 can be suppressed from progressing. As such, the spring function of the plurality of springs 24 is maintained, and the shock-buffer performance of the plurality of springs 24 can be suppressed from decreasing. As a result, the plurality of springs 24 can serve as cushioning materials when transporting the battery device 1 to another installation site.

Sixth Embodiment

Next, a battery unit 100 provided with a plurality of battery frames of the aforementioned embodiments will be described with reference to FIG. 8. The battery unit 100 may be provided with a plurality of battery frames of one of the aforementioned embodiments, or may be provided with a plurality of battery frames of different embodiments. As shown in FIG. 8, each of the plurality of battery frames has a battery module 10 disposed thereon. The plurality of battery frames configures a sub unit 50 by a plurality thereof being stacked at intervals in the vertical direction (Z direction). A number of the battery frames configuring each sub unit 50 is not particularly limited, however, in the present embodiment, two battery frames are stacked in the Z direction. The battery unit 100 has the sub units 50 arranged along the X and Y directions at intervals. Specifically, the battery unit 100 has two sub units 50 arranged in the X direction, and two sub units 50 arranged in the Y direction. That is, the battery unit 100 is configured such that four sub units 50 are arranged in a matrix when seen in the plan view. The intervals between the sub units 50 in the X direction are equal to the intervals between the sub units 50 in the Y direction. Further, Y-directional positions of the sub units 50 that are adjacent to each other in the X direction are identical, and X-directional positions of the sub units 50 that are adjacent to each other in the Y direction are identical.

A distance between lower surfaces of the base members 22 of the battery device arranged on top and the upper surface of the battery module 10 (the upper surface of the lid 10b) of the battery device arranged below, and a distance between lower surfaces of the base members 22 of the battery device arranged below and a floor surface may be set so that intervals that are equal to or greater than a safety standard value are secured. Further, the intervals between the sub units 50 can suitably be adjusted according to lengths of wirings connecting adjacent battery modules 10. It should be noted that the number of the battery frames configuring the battery unit 100 is not limited to the above, and it may suitably be changed, for example, according to a size of a container for storing the battery frames. It should further be noted that each battery module 10 is supported by the springs 24 on the battery frame 20, and therefore the springs 24 do not need to be removed. Due to this, the positional changes of the battery module 10 relative to the battery frame before and after the transportation can be suppressed. Due to this, the transportation can be performed in a state where the battery module 10 in the sub units 50 are already connected by the wirings. Further, the transportation can be performed in a state where the adjacent sub units 50 are housed in the container, and the battery modules 10 housed in the containers are connected by the wirings. Due to this, the man-hours for the installation work after the transportation can further be reduced.

Seventh Embodiment

Next, an example of a method of installing the battery device will be described. In this embodiment, a method of installing the battery device provided with the stoppers 34 will be described. As shown in FIG. 9, this installation method firstly disposes the battery module 10 on the battery frame 20 using an operation crane C at a first location M (for example, at a manufacturing factory).

Then, as shown in FIG. 10, the battery frame in which the battery module 10 is disposed is transported using an operation fork lift F, and houses it in a container. Then, the container that houses a plurality of battery modules is transported to an installation location N. Next, the battery modules 10 are installed to the installation location N altogether with the container. It should be noted that, when the container is to be transported to the installation location N, the battery frames are transported in a state where the stoppers 34 are not arranged.

Then, after having installed the container at the installation location N, the stoppers 34 are installed between the slide bases 23 and the support plates 26 similar to FIGS. 6 and 7. The installation of the stoppers 34 can be performed manually by workers.

The embodiments of the art disclosed in the description has been described in detail, however, these are mere exemplary indications and thus do not limit the scope of the claims. The art described in the claims include modifications and variations of the specific examples presented above.

Technical features described in the description and the drawings may technically be useful alone or in various combinations, and are not limited to the combinations as originally claimed. Further, the art described in the description and the drawings may concurrently achieve a plurality of aims, and technical significance thereof resides in achieving any one of such aims.

The invention claimed is:

1. A battery device comprising:
a battery frame; and
a battery module disposed on the battery frame,
wherein
the battery frame comprises:
a base member;
a slide base being disposed on an upper surface of the base member and being formed in a rectangular shape defined by a pair of first sides extending in a first direction and a pair of second sides extending in a second direction in a plan view;
a plurality of metal springs being mounted on an upper surface of the slide base at intervals along the first direction of the slide base, and being extensible in a vertical direction;
a support plate being connected to upper sides of the plurality of springs and having an upper surface on which the battery module is supported; and
a stopper disposed at a position between an upper surface of the slide base and a lower surface of the support plate and different from positions where the plurality of springs is disposed,
wherein the stopper is not in contact with the support plate when the plurality of springs is in an initial state, and is in contact with the support plate when the plurality of springs is compressed by a predetermined length from the initial state.

2. The battery device according to claim 1, wherein
the battery frame further comprises a plurality of metal bands fixing the battery module to the support plate,
each of the plurality of metal bands has one end connected to one of the pair of first sides and the other end connected to the other of the pair of first sides, and the battery module is held between the plurality of metal bands and the support plate.

3. The battery device according to claim 1, wherein the battery frame further comprises a buffer member being disposed between a lower surface of the battery module and the upper surface of the support plate, and the buffer member is constituted of an incombustible material.

4. The battery device according to claim 1, wherein the battery frame further comprises a positioning member being disposed to encircle an outer periphery of the upper surface of the support plate and to position the battery module with respect to the support plate in a horizontal direction, and the positioning member comprises:
  a first portion being in contact with the support plate; and
  a second portion being bent from the first portion and extending upward, the second portion being in contact with a side surface of the battery module.

5. A battery unit comprising:
a plurality of the battery frames according to claim 1, the plurality of the battery frames being arranged at intervals in the vertical direction and arranged at intervals along at least one of the first direction and the second direction; and
a plurality of battery modules,
wherein
each of the plurality of battery modules is placed on a corresponding one of the plurality of battery frames.

6. A method of installing the battery device according to claim 1, the method comprising:
  placing the battery module on the battery frame at a first location;
  conveying the battery frame on which the battery module is placed from the first location to a second location in a state where the stopper is not disposed between the slide base and the support plate;
  installing the battery frame on which the battery module is placed at the second location; and
  disposing the stopper between the slide base and the support plate after installing the battery frame at the second location.

* * * * *